UNITED STATES PATENT OFFICE.

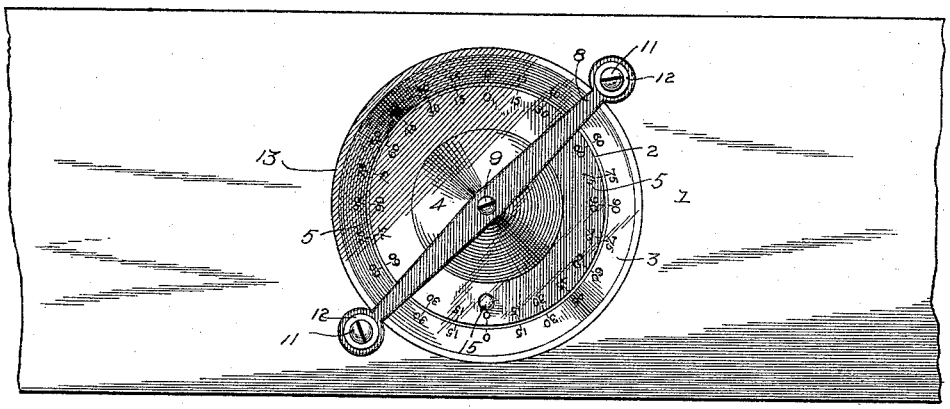

WILLIAM O. PROCTOR, OF PORTLAND, KANSAS, ASSIGNOR OF ONE-HALF TO HAYDEN J. DONAHUE, OF SAME PLACE.

PLUMB-LEVEL.

SPECIFICATION forming part of Letters Patent No. 540,188, dated May 28, 1895.

Application filed March 23, 1895. Serial No. 542,984. (No model.)

*To all whom it may concern:*

Be it known that I, WILLIAM O. PROCTOR, a citizen of the United States, residing at Portland, in the county of Sumner and State of Kansas, have invented a new and useful Plumb-Level, of which the following is a specification.

The invention relates to improvements in plumb levels.

The object of the present invention is to improve the construction of plumb levels, and to provide one possessing absolute accuracy, and adapted for use in all places where accuracy is absolutely necessary.

A further object of the invention is to provide a plumb level, which will present at each side or face continuous graduated annular faces, and in which the parts may be readily adjusted to counteract any inaccuracy due to wear, or other cause, and which, when not in use, may be fixed to prevent oscillation and consequent wear of the parts.

The invention consists in the construction and novel conbination and arrangement of parts, hereinafter fully described, illustrated in the accompanying drawings, and pointed out in the claim hereto appended.

In the drawings, Figure 1 is an elevation of a plumb-level constructed in accordance with this invention. Fig. 2 is a sectional view. Fig. 3 is a detail view of the graduated disk.

Like numerals of reference indicate corresponding parts in all the figures of the drawings.

1 designates a level-body, provided with a circular opening 2, having its edges beveled from the side faces of the level-body to the center, and forming oppositely disposed inclined faces 3, which are graduated throughout their entire surface, the numbers of the graduations being from naught to ninety. Within the circular opening 2 is mounted a graduated disk 4, tapered in thickness from its center to its periphery and provided on each face with graduations 5 from naught to ninety, corresponding with the graduations on the beveled faces 3 of the level-body. The graduated disk is provided with a central pivot 6 extending from opposite faces thereof, and having tapered or conical ends fitting in sockets 7 of supporting cross-bars 8 and received by set screws 9, mounted on the cross-bars 8, and provided with conical bearings. The conical bearings of the set screws correspond to the tapered or conical ends of the pivot, and the set screws are adapted to be adjusted to regulate the friction, to cause the disk to rotate with the desired freedom, and they are also adapted to bind against the pivot to hold the graduated disk against rotation when the plumb level is not in use, whereby unnecessary wear of the pivot and the bearings is prevented.

The cross-bars 8 are preferably disposed in opposite directions, and are arranged at an inclination of forty-five degrees and are provided at their terminals with openings 10, receiving screws 11, and washers 12 are interposed between the heads of the screws and the ends of the screw-bars. The openings of the cross-bars are of greater diameter than the screws, to permit the cross-bars to be moved in any direction to adjust the disk to counteract any eccentricity, and to maintain the disk properly centrally of the opening 2. The periphery of the disk is arranged close to the central ridge formed by the graduated faces 3 of the level-body, and sufficient space is left between such peripheries, in order that the graduated disk may rotate freely. The disk practically fills the opening 2, and it is not affected by wind, and is absolutely accurate, and the great number of readings presented by the continuous series of graduations at each face of the plumb level will be readily apparent.

The disk may, if desired, be protected from dust by transparent plates 13 of glass, arranged at the faces of the level body, central openings 14 of sufficient size being provided for the reception of the sockets of the cross-bars, to permit the latter to be freely adjusted to set the graduated disk properly; but the glass plates may be omitted if desired.

The disk 4 may be provided with a peripheral ring, and this may be graduated as before explained, and as illustrated in the accompanying drawings, but the disk itself may be graduated.

It will be seen that the plumb level presents continuous graduated annular faces on the disk as well as the level-body, that it possesses absolute accuracy to enable it to be used in scientific, professional, mechanical, and similar calculations, and that any inaccuracy caused by wear may be readily counteracted.

The graduated disk may be constructed of any suitable material, and its weight 15 may be either formed integral with the disk, or constructed separate, and the arrangement of the cross-bars for supporting the pivot, which is rigid with the disk, may be varied.

Changes in the form, proportion, and the minor details of construction may be resorted to without departing from the principle or sacrificing any of the advantages of this invention.

What I claim is—

A plumb level, comprising a level-body, having a circular opening and provided thereat with oppositely beveled faces forming a central ridge within the opening, and bearing graduations, the cross-bars extending across the opening and arranged at opposite faces of the level-body and adjustably secured thereto, and the tapered graduated disk arranged centrally within the opening of the level body and provided on its faces with graduations, and having a weight, said disk being provided with a central pivot mounted on and adjustably connected with the cross-bars, whereby the disk may be maintained plumb, substantially as described.

In testimony that I claim the foregoing as my own I have hereto affixed my signature in the presence of two witnesses.

WILLIAM O. PROCTOR.

Witnesses:
J. E. RUSSELL,
ALEX. THORPE.